United States Patent [19]

Stubbs

[11] Patent Number: 4,464,952
[45] Date of Patent: Aug. 14, 1984

[54] CONTROL SYSTEMS FOR CONTINUOUSLY VARIABLE RATIO TRANSMISSIONS (CVT)

[75] Inventor: Peter W. R. Stubbs, Hampton Magna, England

[73] Assignee: BL Technology Limited, London, England

[21] Appl. No.: 268,767

[22] Filed: Jun. 1, 1981

[30] Foreign Application Priority Data

May 31, 1980 [GB] United Kingdom ................ 8017895

[51] Int. Cl.³ ............................................. F16H 37/06
[52] U.S. Cl. ........................................ 74/690; 74/857;
74/866; 74/336 R; 192/0.076; 192/0.032;
192/3.58
[58] Field of Search ................ 74/690, 866, 877, 857,
74/336 R; 192/0.032, 0.033, 3.58, 3.31, 0.092,
0.073, 0.076

[56] References Cited

U.S. PATENT DOCUMENTS

| | | | |
|---|---|---|---|
| 4,107,776 | 8/1978 | Beale | 74/866 X |
| 4,140,031 | 2/1979 | Sibeud et al. | 74/866 |
| 4,281,567 | 8/1981 | Maurer | 74/866 |
| 4,291,594 | 9/1981 | Baudoin | 74/866 X |
| 4,297,918 | 11/1981 | Perry et al. | 74/690 |
| 4,355,547 | 10/1982 | Poole et al. | 74/690 |

FOREIGN PATENT DOCUMENTS

| | | | |
|---|---|---|---|
| 959763 | 6/1964 | United Kingdom . | |
| 1078791 | 8/1967 | United Kingdom . | |
| 1228749 | 4/1971 | United Kingdom | 74/690 |
| 1525861 | 9/1978 | United Kingdom . | |

Primary Examiner—Allan D. Herrmann
Assistant Examiner—Frank McKenzie
Attorney, Agent, or Firm—Brisebois & Kruger

[57] ABSTRACT

A transmission incorporating a continuously variable ratio unit connected to further gearing, such that a plurality of regimes are available with synchronous shifting between regimes, is controlled such that to avoid hunting between regimes when the transmission is running at or around the synchronous ratio, regime and ratio changing beyond the synchronous ratio is inhibited until the optimum ratio for the prevailing operating conditions differs from the synchronous by a predetermined value.

11 Claims, 2 Drawing Figures

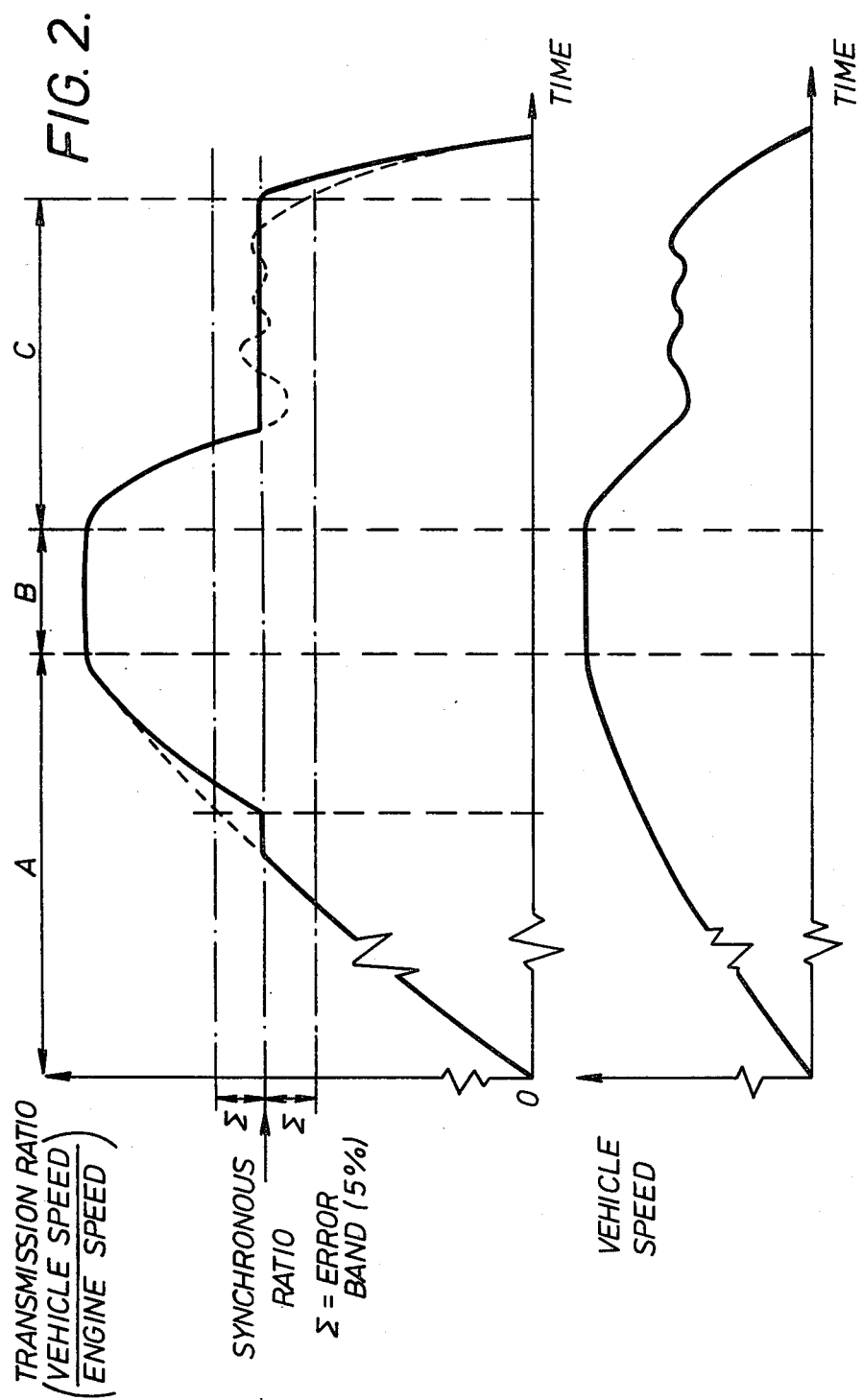

CONTROL SYSTEMS FOR CONTINUOUSLY VARIABLE RATIO TRANSMISSIONS (CVT)

It is already known how, in order to expand the naturally occurring ratio range of a CVT to make it more suited to its application, it can be used in more than one operating mode or regime. UK Pat. Nos. 1,078,791 and 1,525,861 describe such arrangements.

The power flow through the transmission is controlled by a number of clutches and/or brakes, and which operating regime is in use is determined by which clutches or brakes are in use.

It is also known to make the change between the two regimes 'synchronous', which means that it is achieved without any change of ratio of the CVT. The requirement for this is that at synchronous ratio, the ratio of the CVT is the same in both regimes. The advantage of synchronous regime changing is that the change is made without changing the speed and therefore momentum of any rotating component of the transmission on and, as a result, without shock or jerk.

The ratio at which the regime change must occur is fixed by the design of the transmission, and in an application where the transmission ratio itself is set by the control system, it is obviously easy to arrange that whatever the desired ratio, the appropriate regime can be engaged by the control system and the ratio set as required.

In some circumstances the transmission is called upon to operate at around the synchronous ratio with small fluctuations in load which theoretically require the use of ratios between just above and just below the synchronous ratio. Unless the control system is adapted to avoid it, these circumstances lead to 'hunting' between high and low regimes with the attendant energy losses through operatiom of the clutch and brake.

It can be arranged for the control system to provide 'hysteresis' between the regimes so as to avoid 'hunting' between them when the ratio is near to the synchronous point.

The effect of hysteresis is, however, to allow the regime to change only when the CVT ratio has gone past the synchronous ratio with the result that the regime change becomes asynchronous which is undesirable beacuse the shock-free nature of the synchronous shift is lost.

Such is the case if the transmission is being used to control the speed of a prime mover and UK Pat. No. 1,525,861 describes a control system for this purpose.

In this case the prime mover speed is controlled in response to power demand so that according to a predetermined schedule, the optimum engine speed is used for each demanded level of power. This is done by causing the transmission ratio to shift up or down depending on whether the engine speed is too high or too low. Ratio itself is not controlled. Transmission input speed (prime mover speed) is controlled, and the ratio will result from this and whatever is the speed of the load.

The problem arises when the resulting ratio is near synchronous and small changes of either input or output speed will cause hunting between regimes.

According to the invention, when the synchronous ratio is reached in a given regime, regime change is inhibited and the transmission ratio is not permitted to pass the synchronous ratio, until the optimum engine speed required by the control system differs from the actual engine speed by a predetermined value. The predetermined value may be a constant or may be a function of engine speeds or other factors.

Preferably the clutch or brake appropriate to the other regime is energised, but the clutch or brake of the existing regime is not released. The transmission will then be locked in synchronous ratio, and can remain there indefinitely without problem if desired.

Embodiments of the invention will now be described by way of example and with reference to the accompanying drawings in which:

FIG. 2 shows graphs of ratio versus time and road speed versus time for an excursion in a motor vehicle equipped with a transmission in accordance with the invention.

Figure 1:
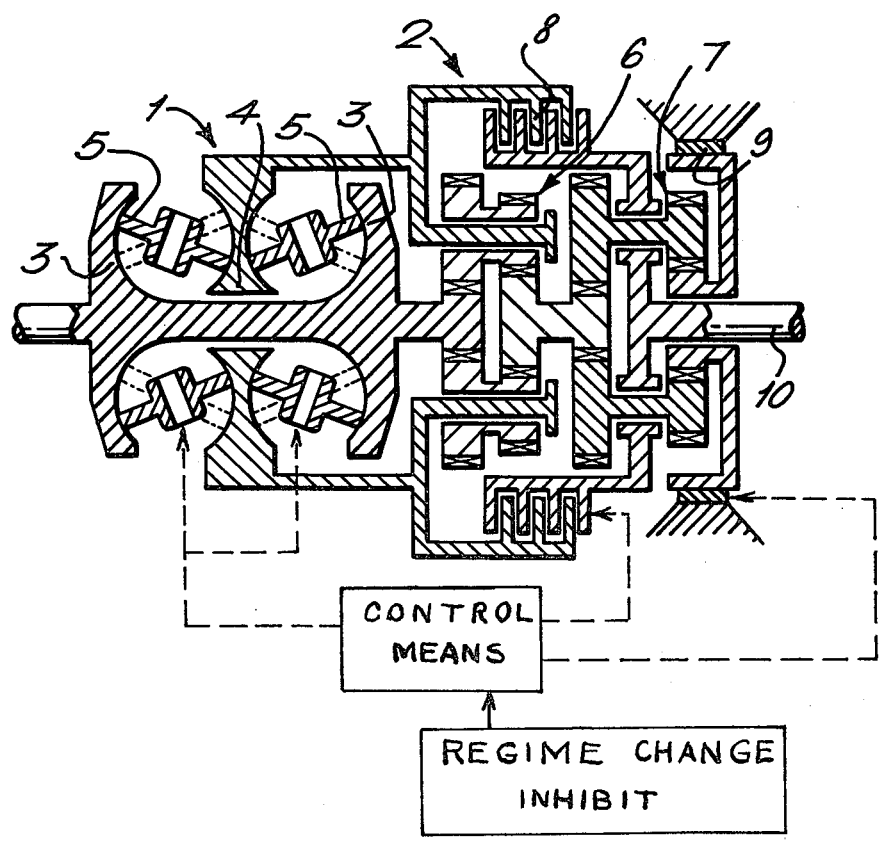
FIG. 1 is a schematic view of a synchronous, twin-engine transmission having a continuously variable ratio unit of the rolling friction type connected to an epicyclic gearset.

FIG. 1 shows a variable ratio transmission 1 of the rolling friction type connected to a compound epicyclic gear set 2. Transmission 1 comprises a pair of input discs 3. Rotation of the discs 3 is communicated to an output disc 4 by rollers 5 which are tiltable inter alia to the positions shown in phantom. Output from the variable-ratio transmission is passed to a first epicyclic gearset 6 and thence through a second gearset 7. The carriers of gearsets 6 and 7 can be locked together by a clutch 8 whilst another clutch means comprising a brake 9 provides further control over operation of the gearset 2. Output from the transmission is by way of a shaft 10 connected to the carrier of gearset 7.

A low regime of ratios is available from the transmission with brake 9 applied and clutch 8 disengaged, transmitting drive through the gearsets 6 and 7. A high regime of ratios is available with clutch 8 engaged and with brake 9 inoperative. The synchronous ratio occurs when rollers 5 are near their maximum tilt angle, and at this ratio either regime may be selected without altering the overall ratio between input discs 3 and output shaft 10. Thus both clutch 8 and brake 9 may be applied simultaneously. At this point the rollers are redundant and can be allowed to track without tilt angle loading.

The transmission is installed in a motor vehicle, an internal combustion engine driving discs 3 while shaft 10 is connected to the vehicle's drive shaft.

An electronic control system (not illustrated) controls operation of the clutch and brake as well as the tilt angle of the rollers, in response to signals representative of the drivers requirements as to vehicle performance, engine speed and torque, and in a first embodiment of the invention, transmission ratio. The control system also controls engine throttle opening.

For any given demand, the control computes the optimum engine speed and throttle opening to achieve the required performance, and adjusts the transmission ratio and throttle to achieve the optimum conditions. According to the first embodiment of the invention, whenever the transmission ratio reaches the synchronous ratio the control system engages both clutch and brake 9 to hold the transmission at the synchronous ratio, and allows the rollers to track without load.

While the transmission is locked at synchronous ratio, it cannot be used to control the speed of the engine, and sooner or later either because of changes in demanded power or in the speed of the load, the engine speed will no longer be at an optimum with respect to the load. In the present embodiment, the control system provides that when the percentage error in engine speed exceeds a predetermined value, for example 5 percent, the transmission is returned to one operating regime or the other by releasing the appropriate clutch or brake. Which regime is engaged will depend on the sense of the engine speed error. If engine speed is too high, the regime giving lower input speeds for a given output speed would be engaged, if too low, the regime giving higher input speeds would be used. It will be seen that the parameter controlling the re-selection of high or low regime is equivalent to defining a ratio error band about the synchronous ratio, such that the transmission is only shifted out of synchronous ratio when the optimum ratio at any given moment differs from the synchronous ratio by more than five percent.

FIG. 2 shows graphically excursions in a vehicle equipped with a transmission as shown in FIG. 1. The broken line shows the ratio of the transmission over the course of the journey in a vehicle equipped with a transmission not incorporating the invention, while the solid line shows the transmission ratio with a transmission modified in accordance with the invention. The adjacent graph showing the speed of the vehicle at given times is common to both arrangements.

As will be seen in time sector A the vehicle not equipped in accordance with the invention accelerates from rest, with the ratio changing steadily as the vehicle's speed increases. Where the ratio reaches the synchronous ratio the transmission immediately changes from low regime to high regime and continues until the steady speed demanded by the driver is achieved. The vehicle then cruises at that speed (sector B) before slowing, due to other traffic for example, to a speed demanding a ratio slightly below synchronous (sector C), thereafter the vehicle's speed rises and falls slightly with the traffic flow, the control system deducing that the ratio should optimally vary about synchronous. As a result, a series of regime changes occurs, each change accompanied by the necessary energy losses in operating the clutch 8 and brake 9. Thus the transmission 'hunts' about the synchronous ratio.

The vehicle equipped in accordance with a first embodiment of the invention can be seen to behave identically to the unmodified vehicle in respect of low regime acceleration, until the synchronous ratio is reached. At this point the ratio is held at synchronous with both clutch 8 and brake 9 simultaneously engaged and the roller tilt angle control released. The vehicle continues to accelerate by effecting an increase in engine speed until such time as the engine speed exceeds the optimum engine speed by five percent, that is to say the transmission ratio error is five percent. At this point the brake 9 is released to place the transmission in high regime. Roller tilt angle control is resumed and ratio quickly increased to permit the engine speed to return to the optimum. Subsequently the transmission behaves identically with the unmodified transmission until sector C is reached, when instead of 'hunting' between high and low regimes the transmission remains locked at synchronous ratio with both clutch 8 and 9 engaged. Thus the energy losses associated with 'hunting' are avoided, the vehicle performing like a conventional vehicle equipped with a stepped ratio transmission in a given gear.

When the speed/ratio error once more exceeds five percent, this time with the engine speed lower than optimum, the transmission shifts into low regime and quickly adjusts by way of the CVT to the optimum engine speed/gear ratio which then decreases further as the vehicle comes to rest in a manner identical to that of the vehicle with the unmodified transmission.

Clearly a number of alternative arrangements are possible. For example, while it is preferred to engage both clutch 8 and brake 9 at the synchronous ratio, and to unload the roller control means, it would be possible to continue to load the roller tilt angle control since this would not result in the ratio changing, although it would result in the generation of internal losses in the transmission which are clearly undesirable, and also an energy loss in loading the rollers. Another alternative would be, when the transmission reached the synchronous ratio, simply to inhibit both further ratio change and any change of regime until the ratio of actual engine speed to optimum engine speed exceeded the predetermined value (five percent in the above example) to justify the regime change. Thus in sector C the transmission would remain in high regime sometimes at, sometimes above the synchronous ratio, until the optimum ratio was more than five percent below synchronous ratio when a regime change would occur and the speed and ratio would reduce as before. It is however preferred to engage both the brake and clutch simultaneously since then the time delay generally imposed by applying the brake or clutch (typically longer than disengaging the other clutch means) when it is decided to change regimes, is avoided.

In a preferred embodiment of the invention, the transmission operates in a similar fashion to that of the first embodiment, simultaneously engaging both clutch means and releasing load on the roller tilt control, when the synchronous ratio is reached. But the criterion for deciding when a regime change is justified is changed. Instead of waiting until the optimum engine speed differs from the actual engine speed by a percentage or ratio, a numerical difference in engine speed is used. For example the shift from synchronous to high or low regime might be delayed until optimum engine speed differed from actual engine speed by fifty revolutions per minute (rpm). Clearly when the optimum engine speed is 1000 rpm this criterion will have the same effect as in the first embodiment: the transmission will shift at five percent error. At 5000 rpm however, the preferred transmission will shift when the optimum speed is 4950 rpm and not approximately 4750 rpm. Thus the possibility of over-revving the engine by undue delay in regime changing at high speeds is reduced. It will be seen therefore that operation of the preferred embodiment is similar to operation of the first embodiment illustrated but with a bandwidth of ratio error which is variable in inverse proportion to the engine speed.

It is possible to specify a different predetermined value for the error dependent upon whether the error is positive or negative. For example regime selection from synchronous could be programmed to occur when actual speed exceeded optimum speed by 50 rpm or when actual speed was less than optimum by 40 rpm or even zero. More complex determinations still are possible, and will depend on the characteristics of the prime mover and its load and the desired accuracy of control.

While a rolling friction-type continuously variable ratio transmission has been illustrated and described, other forms of continuously variable unit could be used, such as a variable ratio belt drive, as described in UK Pat. No. 959763.

I claim:

1. In a transmission of the type having a continuously variable ratio unit, further gearing, clutch means for operating the transmission in two regimes with synchronous shifting between the regimes, and control means for varying the transmission ratio according to a predetermined control strategy ratio in dependence on load and engine speed, the improvement comprising, means to inhibit regime changing from the synchronous ratio until the synchronous ratio differs from the predetermined control strategy ratio by at least a predetermined value.

2. A transmission as claimed in claim 1, wherein the difference in ratios is determined by determining the difference between an input of the transmission and a predetermined optimum speed.

3. A transmission as claimed in claim 1 or 2 wherein the transmission remains in a regime until the difference in ratios reaches said predetermined value.

4. A transmisison as claimed in claim 1 or 2, including a plurality of clutch means, one of which is engaged in one regime, the other being engaged in the other regime, wherein both clutch means are engaged when the synchronous ratio is reached to hold said transmission ratio at the synnchronous ratio until the control strategy ratio differs from the synchronous ratio by said predetermined value.

5. A transmission as claimed in claim 4, wherein said continuously variable ratio unit is locked when said plural clutch means are engaged.

6. A transmission as claimed in claim 1, wherein said predetermined value is a constant.

7. A transmission as claimed in claim 6, wherein said predetermined value is a fixed percentage of the control strategy ratio.

8. A transmission as claimed in claim 2, wherein said difference is a fixed speed difference.

9. A transmission as claimed in claim 1, wherein said predetermined value varies in accordance with engine operating parameters.

10. A transmission as claimed in claim 1, wherein said predetermined value when said transmission ratio is increasing is different from the predetermined value when the ratio is decreasing.

11. A method of controlling a transmission of the type having a continuously variable ratio unit, further gearing, clutch means for operating the transmission in two regimes with synchronous shifting between the regimes, and control means for varying the transmission ratio according to a predetermined control strategy including shifting from one regime to the other from a synchronous ratio of the transmission, said method comprising inhibiting shifting of the transmission from the synchronous ratio to either regime until an optimum ratio of vehicle speed to engine speed deviates from the synchronous ratio by at least a predetermined value.

* * * * *